(12) United States Patent
Frost et al.

(10) Patent No.: US 11,669,519 B2
(45) Date of Patent: Jun. 6, 2023

(54) SYSTEM FOR GENERATING PREDICATE-WEIGHTED HISTOGRAMS

(71) Applicant: SOLARWINDS WORLDWIDE, LLC, Austin, TX (US)

(72) Inventors: Fred Warren Frost, Charlotte, NC (US); Gregory H. Gonzalez, Charlotte, NC (US); John Brooke Philpott, Charlotte, NC (US); Richard L. Taylor, Jr., Huntersville, NC (US)

(73) Assignee: SOLARWINDS WORLDWIDE, LLC, Austin, TX (US)

( * ) Notice: Subject to any disclaimer, the term of this patent is extended or adjusted under 35 U.S.C. 154(b) by 536 days.

(21) Appl. No.: 16/818,566

(22) Filed: Mar. 13, 2020

(65) Prior Publication Data
US 2021/0286809 A1    Sep. 16, 2021

(51) Int. Cl.
*G06F 16/242* (2019.01)
*G06F 16/2453* (2019.01)
*G06F 16/22* (2019.01)
*G06F 16/21* (2019.01)

(52) U.S. Cl.
CPC ........ *G06F 16/2428* (2019.01); *G06F 16/217* (2019.01); *G06F 16/221* (2019.01); *G06F 16/2453* (2019.01)

(58) Field of Classification Search
CPC .. G06F 16/2428; G06F 16/217; G06F 16/221; G06F 16/2453
See application file for complete search history.

(56) References Cited

U.S. PATENT DOCUMENTS

| | | | |
|---|---|---|---|
| 6,278,989 B1 | 8/2001 | Chaudhuri et al. | |
| 6,360,214 B1 | 3/2002 | Ellis et al. | |
| 6,460,045 B1 | 10/2002 | Aboulnaga et al. | |
| 7,127,456 B1* | 10/2006 | Brown | G06F 16/217 707/999.005 |
| 7,707,005 B2 | 4/2010 | Fraser et al. | |
| 7,877,374 B2 | 1/2011 | Zabback et al. | |
| 8,972,378 B2 | 3/2015 | Halverson et al. | |
| 9,235,446 B2 | 1/2016 | Bruno et al. | |
| 2002/0198896 A1* | 12/2002 | Chaudhuri | G06F 16/2462 707/999.2 |
| 2005/0223019 A1 | 10/2005 | Das et al. | |
| 2007/0078808 A1* | 4/2007 | Haas | G06F 16/2462 707/999.002 |
| 2008/0133454 A1 | 6/2008 | Markl et al. | |
| 2011/0307423 A1* | 12/2011 | Shotton | G06K 9/6282 706/12 |
| 2014/0122381 A1* | 5/2014 | Nowozin | G06N 20/00 706/12 |

\* cited by examiner

*Primary Examiner* — Kannan Shanmugasundaram
(74) *Attorney, Agent, or Firm* — Squire Patton Boggs (US) LLP

(57) ABSTRACT

Embodiments of the present invention provide a method, computer program-product, and system for generating predicate-weighted histograms in a database management system. Further, the methods, computer program-products and systems in accordance with the present invention generate histograms that are biased towards the predicate literals of the queries that are submitted to the database management system. The resulting histograms will improve query performance by generating histograms with greater resolution near predicate literals that represent the queries submitted to the database management system.

19 Claims, 7 Drawing Sheets

| RANGE_HI_KEY | EQ_ROWS | DISTINCT_RANGE_ROWS | RANGE_ROWS | AVG_RANGE_ROWS |
|---|---|---|---|---|
| $k_1$ | $c_1$ | 0 | 0 | 0 |
| $k_2$ | $c_2$ | 0 | 0 | 0 |
| $k_3$ | $c_3$ | 0 | 0 | 0 |
| ... | ... | 0 | 0 | 0 |
| $k_d$ | $c_d$ | 0 | 0 | 0 |

505 — RANGE_HI_KEY
510 — EQ_ROWS
515 — DISTINCT_RANGE_ROWS
520 — RANGE_ROWS
525 — AVG_RANGE_ROWS
500

*FIG. 5*

SYSTEM FOR GENERATING PREDICATE-WEIGHTED HISTOGRAMS

BACKGROUND

A database management system is used to sort large amounts of data into stored data tables comprising the database. Each data table may have any number of columns of data, as required or determined by users creating the databases and/or storing the data. Further, database management systems can generate statistics objects, which include histograms, to represent the underlying data table and make access to such data more efficient. More specifically, the histogram is represented by a number of "buckets" or "steps" that represent a range of data values and a frequency value of the data within the bucket. When a user queries the database to identify a particular row or rows of data, the database management system will generate an execution plan (e.g., a series of processes that can be executed to identify the requested data) based on the distribution of data represented in the histogram. Therefore, it is imperative to the operation of the database management system to maintain accurate histograms in order to quickly and efficiently handle query requests.

The present invention is directed to generating histograms for a database that incorporate weighting and penalty factors determined from captured query data.

BRIEF SUMMARY OF THE INVENTION

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for generating histograms that are weighted or biased to query predicate literals. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The present invention may be configured as a system comprising one or more processor components, one or more memory components operatively coupled to the one or more processor components, and computer readable instructions stored on the one or more memory components and configured to cause the one or more process components to proceed according to embodiments as described herein. Alternatively, the invention may be configured as a method following the steps according to embodiments as described herein. In still further embodiments, the invention may be configured as a computer program product configured according to embodiments as described herein. For simplicity, this summary section will focus on embodiments of the present invention as a system, though it should be understood that both the method and computer program product embodiments would perform similarly in their respective environments.

A system in accordance with embodiments of the present invention initializes a working histogram for a data column, the data column comprising a plurality of data values. The working histogram comprises a plurality of rows, each row corresponding to a unique data value from the plurality of data values. The system further captures on or more queries, wherein the one or more queries comprise or more predicate literals. The system is then configured to generate a weigh vector based on the predicate literals, wherein the weigh vector comprises a plurality of weight values, each weight value corresponding to one of the plurality of rows of the working histogram. Next, the system calculates a cost value for each row of the working histogram, wherein each cost value is determined at least in part on an information loss and the weight value corresponding to one of the rows of the working histogram. The system then identifies a first row in the working histogram having a lowest cost value of the plurality of rows in the working histogram. The system then merges the first row with a second row of the working histogram. In some embodiments of the invention, the first row of the working histogram and the second row of the working histogram are adjacent rows.

In further or alternative embodiments of the invention, the system is further configured to calculate a number of rows in the working histogram. The system then determines that the number of rows in the working histogram is greater than a predetermined threshold number of rows. The system then repeats the steps described in the preceding paragraph until the total number of rows is less than or equal to the predetermined threshold number of rows.

The system may further be configured to compare a distribution of weights values to a distribution of the rows and determine that the distribution of weight values is sufficiently different to the distribution of the rows in the working histogram. Comparing the distribution of weight values to the distribution of the rows in the working histogram may further comprise performing a statistical non-parametrical test to generate a comparison score and determining that the comparison score is less than a predetermined threshold comparison score.

In additional or alternative embodiments of the invention, capturing one or more queries may comprise capturing one or more queries that meet or exceed a predetermined threshold. The predetermined threshold may be a runtime for the one or more queries. Alternatively, the predetermined threshold may be a CPU time.

In additional or alternative embodiments of the invention, generating a weight vector may comprise generating a kernel density function for the one or more predicate literals and evaluating the kernel density function at each row in the working histogram. In some embodiments of the invention the bandwidth of the kernel density function is proportional to a variance in the one or more predicate literals.

In still further embodiments of the invention, information loss is calculated as an entropy value of a merged row in the working histogram less the sum of the entropy of a first row in the working histogram and a second row in the working histogram, wherein the merged row comprises the first row and the second row. In some embodiments of the invention, entropy is calculated using Shannon's entropy formula.

In still further embodiments of the invention, the system further calculates one or more of a range penalty, an information loss, a legacy information loss, and a scaling parameter. In such embodiments, the cost function is further based on the one or more of a size penalty, an information loss, a legacy information loss, and a scaling parameter.

In some embodiments of the invention, the data column may be indexed. In other embodiments of the invention, the data column may be filtered. In still other embodiments of the invention, the data column may be clustered.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
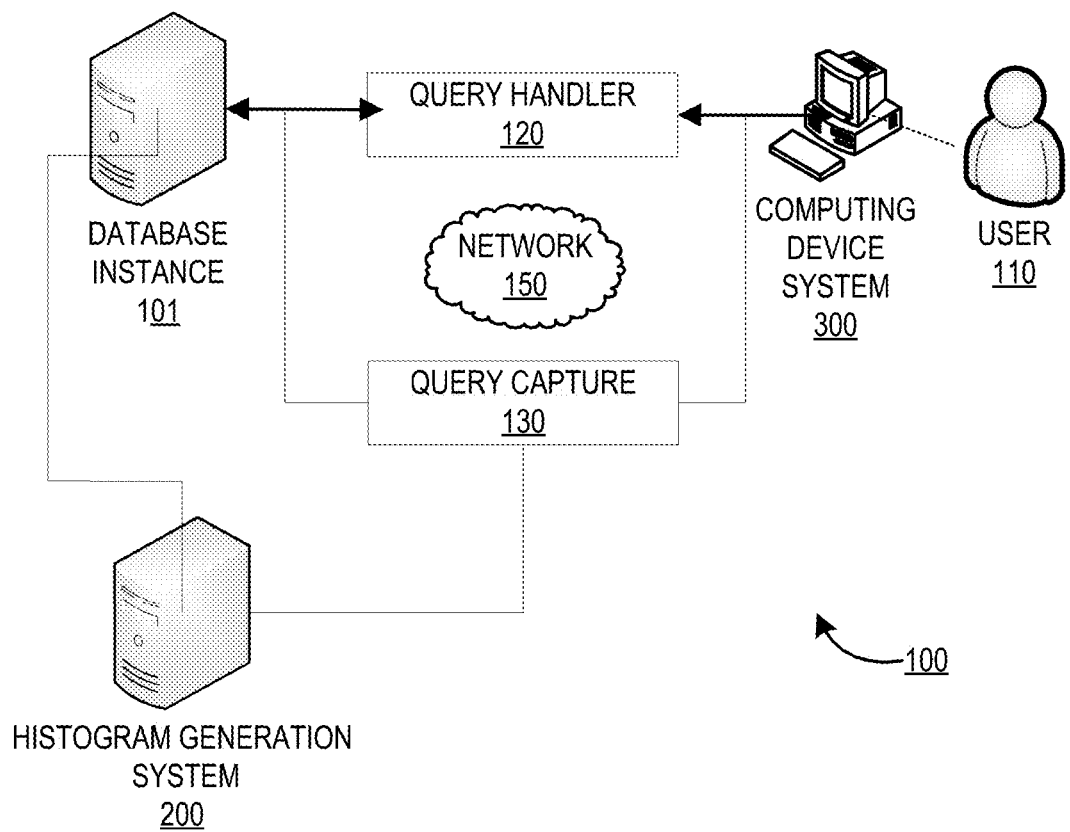
Figure 2:
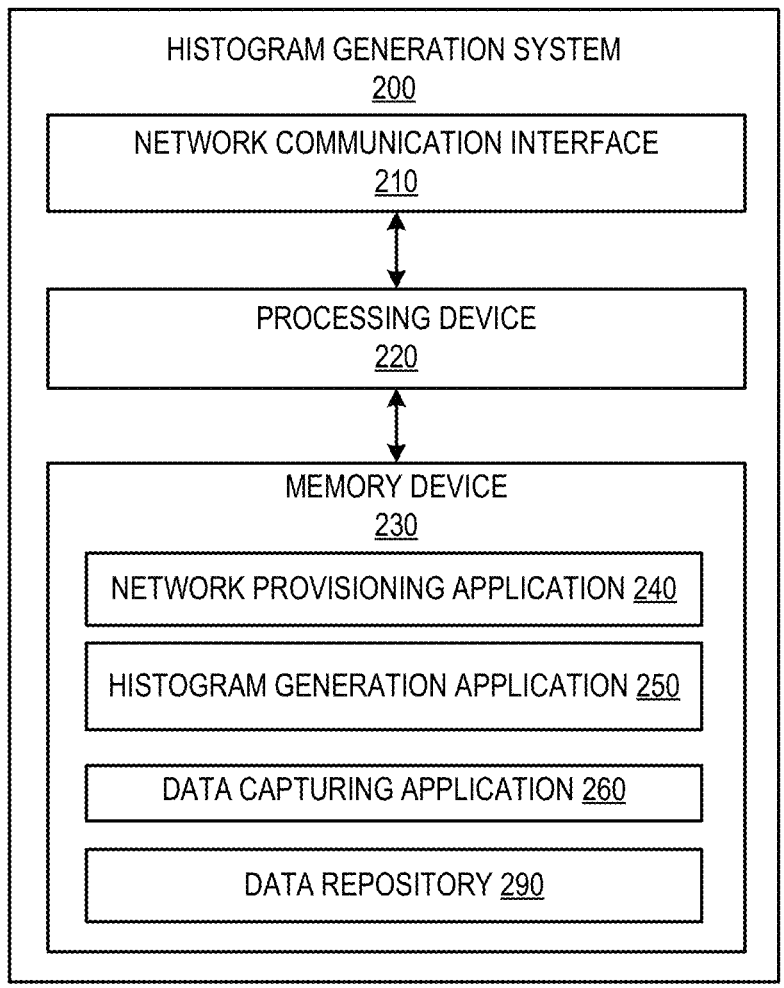
Figure 3:
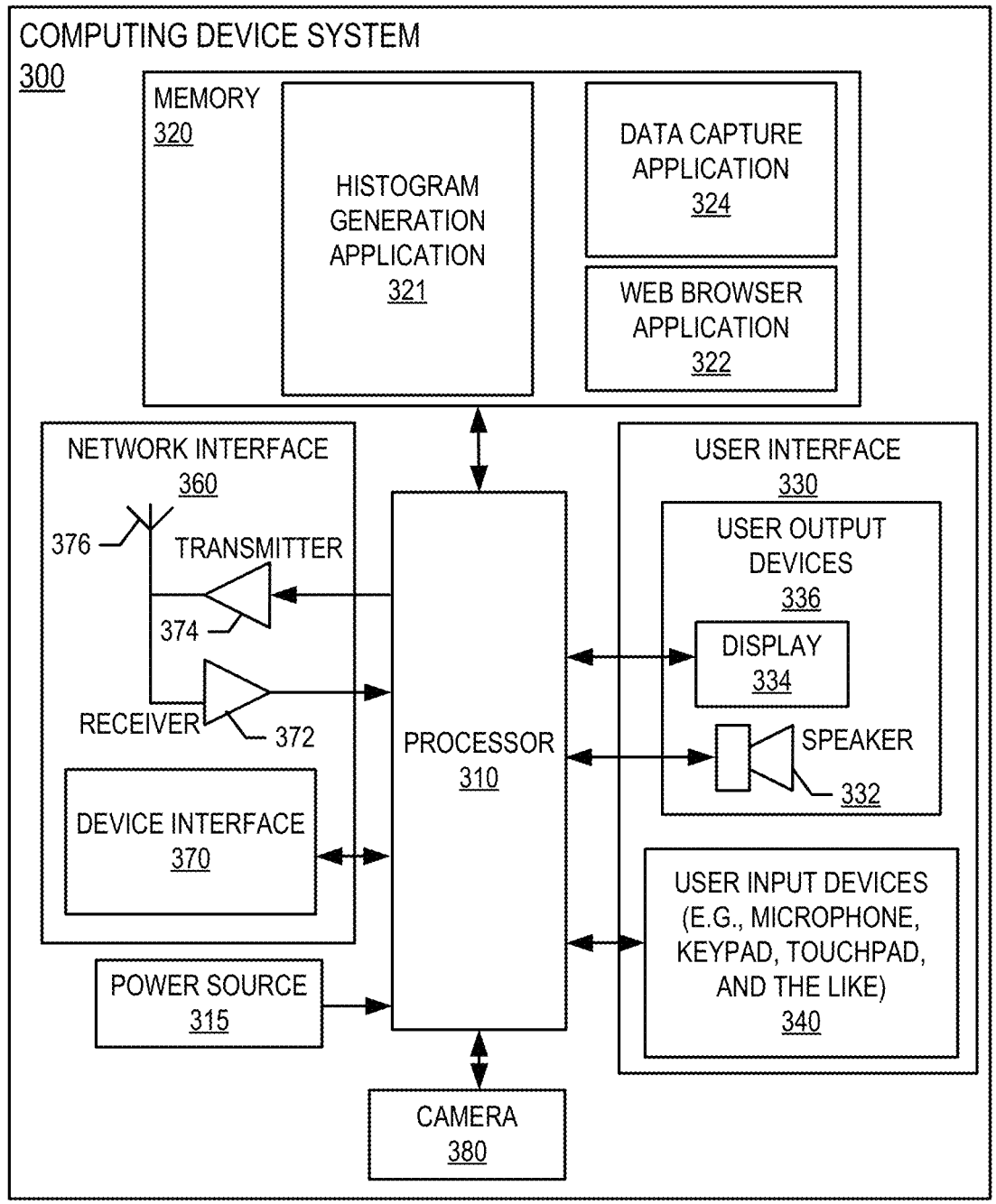
Figure 4A:
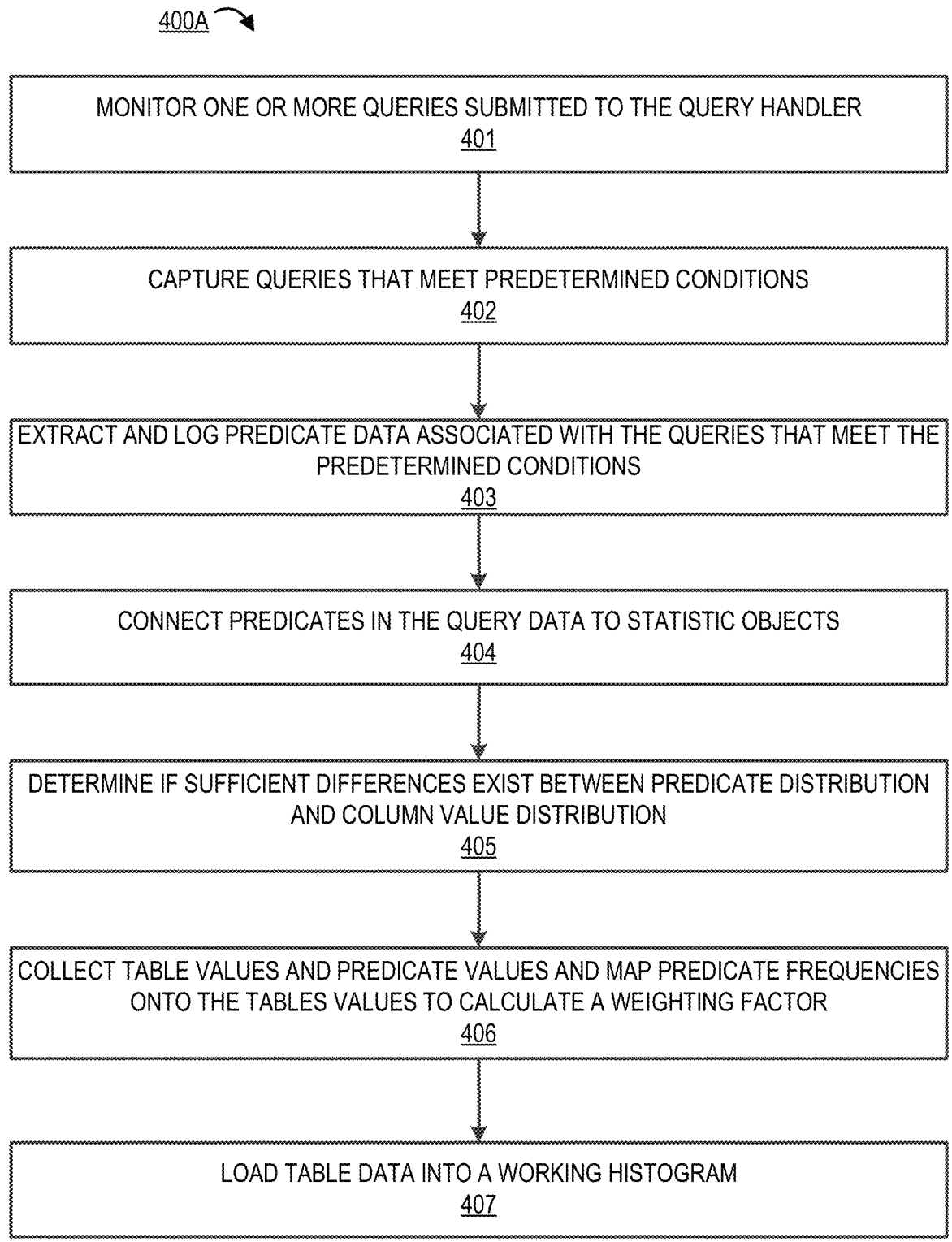
Figure 4B:
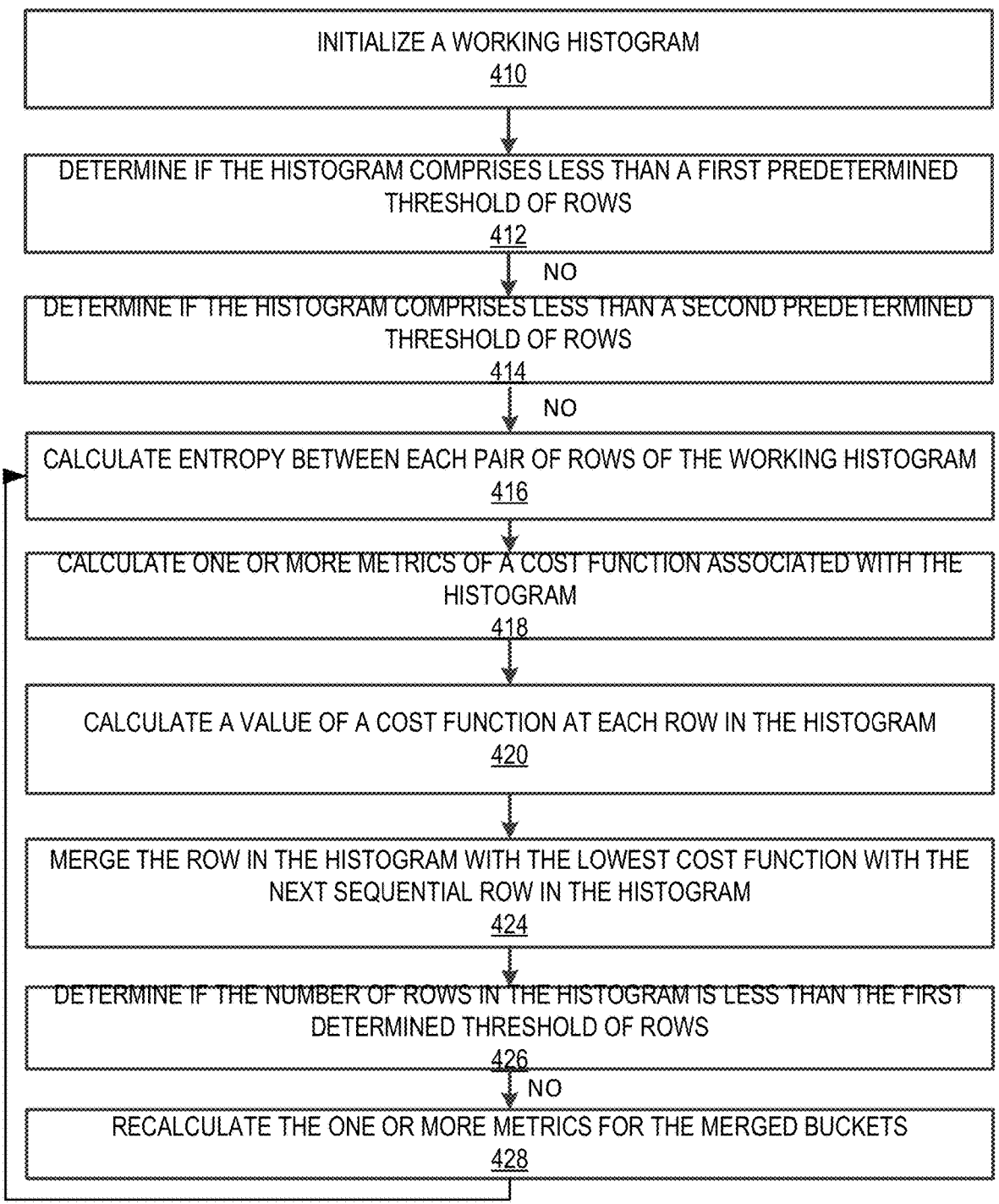

Having thus described embodiments of the invention in general terms, reference will now be made the accompanying drawings, wherein:

FIG. 1 provides a block diagram illustrating a system environment for generating histograms based on query predicates, in accordance with an embodiment of the invention;

FIG. 2 provides a block diagram illustrating a histogram generation system 200 of FIG. 1, in accordance with an embodiment of the invention;

FIG. 3 provides a block diagram illustrating the computing device system 300 of FIG. 1, in accordance with an embodiment of the invention;

FIG. 4A provides a flowchart illustrating a process flow for generating histograms based on query predicates, in accordance with an embodiment of the invention;

FIG. 4B provides a flow chart for construction a [fully-realized] histogram in accordance with an embodiment of the invention.

FIG. 5 depicts an initialized histogram generated in accordance with an embodiment of the invention.

Figure 6:
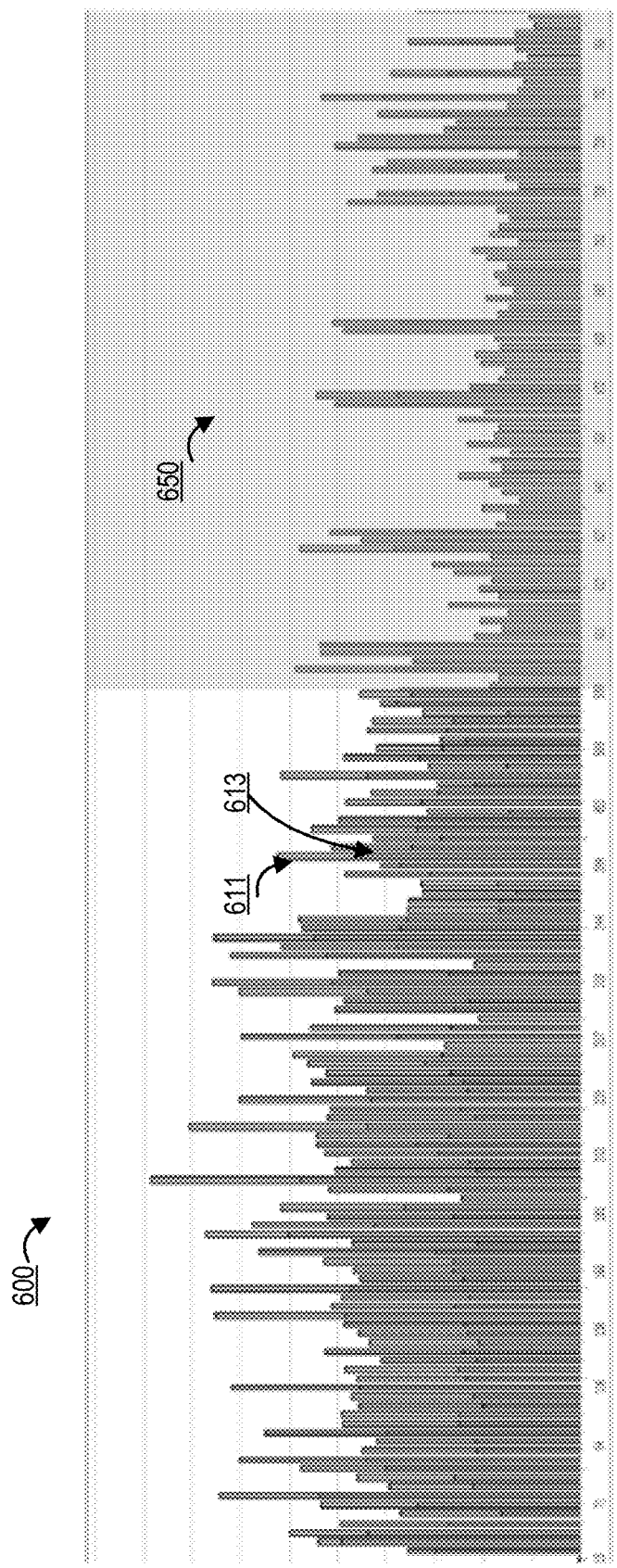

FIG. 6 provides a graphical representation of a fully constructed histogram generated according to an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also comprise the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Many of the exemplar embodiments and implementations described herein contemplate interactions engaged in by a user with a computing device and/or one or more communication devices and/or secondary communication devices. A "user", as referenced herein, may refer to an entity or individual that has the ability and/or authorization to access and use the system of the present invention and/or a database instance. Furthermore, as used herein, the term "user computing device" may refer to, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface comprises a graphical user interface (GUI) or an interface to input computer-executable instructions that direct a processing device to carry out specific functions. The user interface typically employs certain input and output devices to input data received from a user second user or output data to a user. These input and output devices may comprise a display, mouse, keyboard, button, touchpad, touch screen, microphone, speaker, LED, light, joystick, switch, buzzer, bell, and/or other user input/output device for communicating with one or more users.

In addition, several terms as used herein contain specific definitions as they relate to database management systems such as Microsoft SQL Server®. As used herein, a "histogram" is a statistical representation of data that is generated based on the column values within a particular table. The data table may comprise any type of data comprised in a number of formats. In addition, columns of the data-table may indexed or non-indexed, filtered or non-filtered, clustered or non-clustered, etc.

Database management systems automatically generate histograms that are organized in a series of "buckets" or "steps" that can be configured to represent the data. A histogram can be depicted as a table, as shown in FIG. 5, where each "bucket" or step is the first column in a row of the table. In such cases, a "row" of a particular histogram may be used interchangeably with the terms "bucket" or "step". In an exemplary embodiment of the present invention, a histogram generated by a database management system (e.g., as generated by Microsoft SQL Server®) in accordance with embodiments of the present invention can comprise up to five columns for each "bucket" or "step": (i) RANGE_HI_KEY, (ii) EQ_ROWS (iii) DISTINCT_RANGE_ROWS, (iv) RANGE_ROWS; and (v) AVG_RANGE_ROWS.

The RANGE_HI_KEY column represents the upper boundary for each bucket or step. The lower boundary for each bucket or step is the lowest value possible in the column that is strictly greater than the RANGE_HI_KEY of the preceding step. Where the step values and underlying data are integers, the lower boundary for each step will be one integer increment higher than the RANGE_HI_KEY value of the preceding bucket.

EQ_ROWS represents the number of data entries in the corresponding table column that are exactly equal to the RANGE_HI_KEY.

RANGE_ROWS represent the number of data entries in the corresponding table column that are between the upper and lower boundary of a particular step. Specifically, the RANGE_ROWS are the number of rows that are greater than the RANGE_HI_KEY for the preceding step and less than the RANGE_HI_KEY of the particular step.

DISTINCT_RANGE_ROWS are the number of distinct records between the two boundary values for the applicable bucket.

AVG_RANGE_ROWS represents the average number of rows per distinct value between the boundary values for bucket. AVG_RANGE_ROWS can be determined by the formula AVG_RANGE_ROWS=RANGE_ROWS/DISTINCT_RANGE_ROWS. If the value for RANGE_ROWS is 0, AVG_RANGE_ROWS is set as equal to 1.

In most database management systems, the number of buckets or steps for a histogram is capped at a predetermined threshold number. For example, Microsoft SQL Server® only permits histograms having a maximum of 200 buckets. It should be understood that the predetermined threshold number may or may not account for null values, which may be stored outside of the predetermined threshold. In any case, a histogram can only exactly replicate (i.e., with no information loss) a data set having less than or equal to twice the predetermined threshold number of buckets (e.g., 400 in Microsoft SQL Server®). For larger data sets, the histogram generated by the database management system cannot represent the data with perfect accuracy, as the data is compressed when additional distinct range row values are added at each histogram step.

In database management systems, a "query" is a search function that is used to retrieve data or otherwise perform operations on a given set of data. A query comprises at least an operator (e.g., SELECT, WHERE, FROM, etc.), a "predicate" (i.e., the string following the operator), and a "literal" (i.e., the value upon which the operations will be compared). A query predicate literal can be either a value or a parameterized variable. It should be understood that where functionality of the present invention is described herein with respect to query predicate literals, the invention may refer to either query predicate literal values or parameterized variables.

The present invention is designed to reduce the amount of time taken and/or the resources required to execute a query by generating histograms that are reflective of the query predicates inputted to a database management system. In that regard, the present invention relates to a system for intelligently generating histograms in a database management system by monitoring query predicates and other query data and generating histograms that are preferentially biased towards the captured query predicate literals. Further, as described herein, the present invention implements a cost function that factors in query predicate weights before combining histogram steps to reduce information loss around the preferentially biased steps.

FIG. 1 provides a block diagram illustrating a database management system environment 100 for generating histograms based on query predicates, in accordance with an embodiment of the present invention. As illustrated in FIG. 1, the environment 100 comprises a histogram generation system 200, a database instance 101, a query handler module 120, a query capture module 130, and a computing device system 300. The system may also comprise one or more users 110 interacting with the other components of the system environment 100 via a user interface of the computing device system 300.

The histogram generation system 200, the database instance 101, the computing device system 300, and/or the third-party systems 101 may be in network communication across the system environment 100 through a network 150. The network 150 may comprise a local area network (LAN), a wide area network (WAN), and/or a global area network (GAN). a network 150 may provide for wireline, wireless, or a combination of wireline and wireless communication between devices in the network. In general, the histogram generation system 200 is configured to communicate information or instructions with the database instance 101, and/or the computing device system 300, across the network 150.

The computing device system 300 may be a computing device of the user 110. In general, the computing device system 300 communicates with the user 110 via a user interface of the computing device system 300, and in turn is configured to communicate information or instructions with the histogram generation system 200, and/or the database instance 101, across the network 150.

As depicted in FIG. 1 and described in more detail below, the histogram generation system 200 is a cognitive system in the present invention for generating histograms using predicate weights assigned to column values, where such weights are determined based on the capture and analysis of query predicates and other relevant query data by the query capture module 130. The histogram generation system 200 is responsible for generating new histograms on the database instance 101 and a vector comprising one weighting value corresponding to each unique column value in the data table. The query capture module 130 can be configured to capture and/or extract characteristics of submitted queries (e.g., run time parameters, query frequency, CPU time, etc.) in addition to the query predicates and query literals for the applicable queries.

As discussed in more detail below, the histogram generation system sorts and aggregates the characteristics received from the query capture module 130 and assigns a weighting factor to the column values in the data table that is calculated based on the distance between the column value (or the "bucket" or "step" value when a histogram has been generated) and the predicate literals (or a clustered approximation of such predicate literals). The histogram generation system is responsible for initializing a working histogram based on the column values in the data table and vector of weighting factors corresponding to the same.

Once the histogram generation system has initialized a working histogram, the histogram generation system is then responsible for constructing a final histogram by combining one or more buckets in order to ensure that the number of buckets is less than a predefined maximum number of buckets. In Microsoft SQL Server®, for example, the maximum number of such buckets is set to 200. As part of constructing a final histogram, the histogram generation system will determine both a predicate weight penalty and the potential information loss resulting from the combination of any two buckets. The histogram generation system will then combine buckets in order to reduce both the penalty from combining strongly weighted predicate values and the potential information loss resulting from the combination. By factoring in predicate weigh values to the construction of a final histogram, the present invention serves to increase the resolution of the histogram at bucket values proximate to the heavily weighted predicate literals. Such increased resolution serves to optimize performance of the database management system 100 and reduce the computing power and query processing time required to execute a query.

In a typical embodiment of the invention, a user 110 will submit one or more queries through a user interface on the computing device system 300. In some embodiments of the invention, the database management system many automatically run queries without user 110 input. The histogram generation system 200 as described herein can be configured to handle both user-generated and system-generated queries, or both. In either case the computing device system 300 will transmit the one or more queries over the network 150. The one or more queries are processed by the query handler 120 and transmitted to the database instance 101. The query handler 120 will then execute a predetermined execution plan to identify and obtain the queried data, which is then returned to the computing device system 300. The execution plan is generated by the query handler based on the statistics objects on the database instance 101, including the histograms stored thereon. In addition, the query capture module 130 receives the query predicates submitted to the query handler 120. The query capture module 130 may also measure (or, as described in more detail below, extract from cached query data or trace logs) the time lapse between the time a query is submitted to the query handler and the time a query is complete and the requested data is returned to the computing device system 300. The query capture module 130 then transmits the captured query predicates (and any other relevant query data, including run time and other information) to the histogram generation system 200 for aggregation and sorting, as described in more detail herein.

As noted in the above paragraph, the query capture module 130 can capture query predicates, query literals, and other relevant query data (e.g., run time, frequency, CPU time, etc.) in a number of different manners. In some embodiments, the query capture module 130 monitors and tracks queries submitted to the database management system in real time and logs such information in another datastore. In such embodiments, the query capture module 130 may need to be placed within the database management system itself in order to accurately capture the input/output data associated with the captured queries. In alternative embodiments (which in many instances may be preferable in order to reduce overhead in the database management system itself), the query capture module 130 is able to extract query data from cached files of historical queries. For example, in Microsoft SQL Server®, historical queries are cached in an accessible .xml file. In still alternative embodiments, the query capture module 130 can extract the query data from trace logs generated by the database management system.

FIG. 2 provides a block diagram illustrating the histogram generation system 200 in greater detail, in accordance with embodiments of the invention. As illustrated in FIG. 2, in one embodiment of the invention, the histogram generation system 200 comprises one or more processing devices 220 operatively coupled to a network communication interface 210 and a memory device 230.

It should be understood that the memory device 230 may comprise one or more databases or other data structures/repositories. The memory device 230 also comprises computer-executable program code that instructs the processing device 220 to operate the network communication interface 210 to perform certain communication functions of the histogram generation system 200 described herein. For example, in one embodiment of the histogram generation system 200, the memory device 230 comprises, but is not limited to, a network provisioning application 240, a histogram generation application 250, a data capturing application 260, and a data repository 290 comprising data processed or accessed by one or more applications in the memory device 330. The histogram generation application 250 and the data capturing application 260 perform one or more steps of the process flow 400 described in FIGS. 4A and 4B. The computer-executable program code of the network provisioning application 240, the histogram generation application 230, and the data capturing application 260 may instruct the processing device 220 to perform certain logic, data-processing, and data-storing functions of the histogram generation system 200 described herein, as well as communication functions of the histogram generation system 200.

The network provisioning application 240, the histogram generation application 230, and the data capturing application 260 are configured to invoke or use the data in the data repository 290 when communicating through the network communication interface 210 with the database instance 101, and/or the computing device system 300. In some embodiments, the network provisioning application 240, the histogram generation application 230, and the data capturing application 260 may store the data extracted or received from the database instance 101, and the computing device system 300 in the data repository 390. In some embodiments, the network provisioning application 240, the histogram generation application 230, and the data capturing application 260 may be a part of a single application.

FIG. 3 provides a block diagram illustrating a computing device system 300 of FIG. 1 in more detail, in accordance with embodiments of the invention. Some embodiments of the computing device system 300 comprise a processor 310 communicably coupled to such devices as a memory 320, user output devices 336, user input devices 340, a network interface 360, a power source 315, and a camera 380. The processor 310, and other processors described herein, generally comprise circuitry for implementing communication and/or logic functions of the computing device system 300. For example, the processor 310 may comprise a digital signal processor device, a microprocessor device, and various analog to digital converters, digital to analog converters, and/or other support circuits. Control and signal processing functions of the computing device system 300 are allocated between these devices according to their respective capabilities. The processor 310 thus may also comprise the functionality to encode and interleave messages and data prior to modulation and transmission. Further, the processor 310 may comprise functionality to operate one or more software programs, which may be stored in the memory 320. For example, the processor 310 may be capable of operating a connectivity program, such as a web browser application 322. The web browser application 322 may then allow the computing device system 300 to transmit and receive web content, such as, for example, location-based content and/or other web page content, according to a Wireless Application Protocol (WAP), Hypertext Transfer Protocol (HTTP), and/or the like.

The processor 310 is configured to use the network interface 360 to communicate with one or more other devices on the network 150. In this regard, the network interface 360 comprises an antenna 376 operatively coupled to a transmitter 374 and a receiver 372 (together a "transceiver"). The processor 310 is configured to provide signals to and receive signals from the transmitter 374 and receiver 372, respectively.

As described above, the computing device system 300 has a user interface that is, like other user interfaces described herein, made up of user output devices 336 and/or user input devices 340. The user output devices 336 comprise a display 330 (e.g., a liquid crystal display or the like) and a speaker 332 or other audio device, which are operatively coupled to the processor 310.

The user input devices 340, which allow the computing device system 300 to receive data from a user such as the user 110, may comprise any of a number of devices allowing the computing device system 300 to receive data from the user 110, such as a keypad, keyboard, touch-screen, touchpad, microphone, mouse, joystick, other pointer device, button, soft key, and/or other input device(s). The user interface may also comprise a camera 380, such as a digital camera. The computing device system 300 further comprises a power source 315, such as a battery, for powering various circuits and other devices that are used to operate the computing device system 300.

The computing device system 300 also comprises a memory 320 operatively coupled to the processor 310. As used herein, memory comprises any computer readable medium (as defined herein below) configured to store data, code, or other information. The memory 320 may comprise volatile memory, such as volatile Random Access Memory (RAM) including a cache area for the temporary storage of data. The memory 320 may also comprise non-volatile memory, which can be embedded and/or may be removable. The non-volatile memory can additionally or alternatively comprise an electrically erasable programmable read-only memory (EEPROM), flash memory or the like.

The memory 320 can store any of a number of applications which comprise computer-executable instructions/code executed by the processor 310 to implement the functions of the computing device system 300 and/or one or more of the process/method steps described herein. For example, the memory 320 may comprise such applications as a conventional web browser application 322, a histogram generation application 321, and a data capture application 324, and a database management application (not shown). The histogram generation application 321 and the data capture application 324 are application provided by the histogram generation system 200. These applications also typically instructions to a graphical user interface (GUI) on the display 330 that allows the user 110 to interact with the database instance 101, the histogram generation system 200, and/or other devices or systems.

The memory 320 can also store any of a number of pieces of information, and data, used by the computing device system 300 and the applications and devices that make up the computing device system 300 or are in communication with the computing device system 300 to implement the functions of the computing device system 300 and/or the other systems described herein.

FIG. 4A depicts an exemplary process flow of the methods for generating histograms using predicate weights in accordance with the present invention. In particular, FIG. 4A depicts the process flow for initializing a working histogram and generating a weighting vector in accordance with embodiments of the present invention. FIG. 4B depicts the process flow for constructing the final histogram by combining one or more buckets of the working histogram in accordance with their respective predicate weight values.

The process flows described in FIGS. 4A and 4B may operate in an environment similar to the database management system environment 100 similar described in FIG. 1. Indeed, the process flows described below may require one or more database instances 101, each comprising a data table with one or more rows and one or more column values corresponding to each of the one or more rows. In some embodiments, the data table with one or more rows and one or more column values will be a sample of a larger data table in the database management system, obtained by page sampling or other known means. Further, the database instance will exist within a database management system, such as Microsoft SQL Server®, that will generate statistics objects (including histograms) on the data stored in the database instance. Further, the database management system will have a query handler 120 to process queries into the database instance. In addition, the database management system environment 100 will have a query capture module 130 for capturing query data. As discussed in more detail above, the query capture module 130 may reside within the database management system or as a standalone software application that can be targeted at a database instance 101.

Beginning at block 401, the histogram generation system monitors one or more queries submitted to the query handler. As discussed above, the query capture module 130 can be configured to capture queries submitted to the query handler in the database management system in a number of ways. For instance, the query capture module 130 can be configured to capture queries in real time as they are submitted to the query handler. In such instances, the query capture module may need to reside within the database management system. Alternatively, the query capture module 130 may be configured to parse historical query data that is cached or otherwise ascertainable from trace logs generated by the database management system. In embodiments of the present invention where the query capture module parses historical query data in accordance with the foregoing, the query capture module 130 can exist as part of a separate software application that exists outside of the database management system that can be aimed at one or more database instances to capture query data. Where real time analysis of query data is not required, such configurations are advantageous in that they do not contribute any additional overhead to the database management system itself.

At block 402, the histogram generation system determines one or more queries that meet predetermined conditions. As discussed above, the query capture module 130 may be configured in different embodiments to capture different types of queries, in order to generate histograms that are better configured to represent the data captured by a certain type of query. For example, the query capture module 130 may be configured to capture all queries that have a run time that exceeds a certain predetermined threshold (e.g., 5 seconds). In such an embodiment, the histogram generation system will proportionately weight the histogram steps proximate to the query predicate values in the query that have run times in excess of the predetermined threshold. As described in more detail below, as the histogram generation system constructs a final histogram, the histogram will have greater resolution (i.e., the number of DISTINCT_RANGE_ROWS at a given histogram step will be reduced) at step values that are closer to the predicate literals that produced query run times in excess of the predetermined threshold. In still other embodiments of the invention, the query capture module 130 may be configured to capture high frequency queries. In such embodiments, the final histogram will have greater resolution at step values proximate to a large number of queries. In turn, the histogram generation system will be able to generate more accurate execution plans for queries that fall within the greater resolution step values, which will in turn reduce the overhead required to execute such queries. It should be understood that the query capture module can be configured to capture any query type that meets a set of predetermined conditions, including run time conditions, frequency conditions (e.g., the number of times a given query or subset of queries are run), the nature and characteristics of the queried column (e.g., whether it is an indexed column, whether the column is an identity column, whether the column is continually ascending or descending), the nature of updates, deletes and insert activity in the queried column, etc.

At block 403, the histogram generation system extracts and logs predicate data associated with the queries that meet the predetermined conditions (i.e., the queries that were captured at block 402). In exemplary embodiments, the histogram generation system may store the captured query data in one or more data tables. The data tables may be organized such that each captured query occupies a row within the table. Each column or separate data table may represent a different data entry with respect to the captured queries. For example, the query data table may include separate columns and/or tables for query predicates, query literals, query run time data, etc. Further, the data table can be sorted into ascending order of the predicate literal values contained therein, facilitating the comparison and mapping to the underlying column values of the original data table.

At block 404, the histogram generation system connects predicates extracted from the query data with existing statistics objects related to the underlying data table. For example, the histogram generation system may identify that the query predicate literals logged in step 403 correspond to a statistics object generated on a specific column within the underlying data table (e.g., an existing histogram for that data column).

At block 405, the histogram generation system determines whether there are sufficient differences between the distribution in the predicate literals that are connected to the existing statistic objects and the column values from the data table underlying such statistics objects. In other words, block 405 looks to determine whether the predicate literal values of the queries input into the database management system are similarly shaped to the column values in the data table. If the predicate literals and the data table column values have a substantially similar distribution, the overall query performance may not materially change by generating a new histogram using weighted predicate values. However, where there are sufficient differences between the distribution of predicate literals and the column values in the underlying table, query performance can be greatly improved by generating new histograms because the new histogram can be weighted to provide greater resolution where the query distribution is proportionately higher.

Embodiments of the present invention may determine the differences in distribution of the predicate literal values and the column values in a number of ways. Some embodiments of the present invention may employ a statistical non-parametric test to compare the respective data sets and generate a comparison score. A Wilcoxon signed rank test an example of one such statistical non-parametric test. If the comparison score falls below a certain predetermined threshold, the data sets will be sufficiently different to justify the generation of a new histogram. However, it should be understood that any test to compare two related data sets may be used to determine whether the predicate literal distribution is similar to the underlying column values. Similarly, some embodiments may not employ any comparison test. In such embodiments, the histogram generation system may determine that query performance will improve from a newly generated histogram without comparing the respective data sets. In some instances, such determination may be made based on user input.

At block 406, once the histogram generation system has determined that there are sufficient differences between the predicate literal distribution and column value distribution, the system collects the column values and maps them to the predicate literal frequencies. In other words, the histogram generation system will apply a weighting factor to the column values based on their relation to the distribution of the predicate literals. In order to perform this weighting, the histogram generation system effectively measures the distance between the column values and the distribution of predicate literals at that column value. In some embodiments of the invention, the system generates a kernel density estimate of the predicate literal distribution and calculates the value of such kernel density estimate at each column value in the data set. The value of the kernel density estimate for each column value in the data set can be stored in a vector. These values will be the predicate weights that are used in connection with the column values to generate the predicate weighted histogram.

At block 407, the histogram generation system loads the column values into a working histogram for further consolidation, if necessary. An example of a working histogram is depicted in FIG. 5. In FIG. 5, a working histogram 500 for d column values in the data table is depicted by the table having RANGE_HI_KEY values $\{k_1, k_2, k_i, \ldots k_d\}$. The RANGE_HI_KEY values in column 505 of the histogram 500 form the bucket values of the histogram. Row 510 of the working histogram 500 represents the EQ_ROWS for each bucket value. The EQ_ROWS $\{c_1, c_2, c_i, \ldots c_d\}$ each correspond to the number of instances in the data table for each bucket value $\{k_1, k_2, k_i, \ldots k_d\}$.

As shown in FIG. 5, column 515 (DISTINCT_RANGE_ROWS), column 520 (RANGE_ROWS), and column 525 (AVG_RANGE_ROWS) each contain null sets for the corresponding bucket value $\{k_1, k_2, k_i, \ldots k_d\}$. At this stage in the process flow 400, the histogram generation system has created a new bucket for each unique column value in the data table. However, as noted above, database management systems typically cap the number of buckets in a histogram at a predetermined threshold (e.g., 200). Thus, for the bucket values $\{k_1, k_2, k_i, \ldots k_d\}$ where d>200, the histogram generation system will need to combine buckets in order to maintain the number of buckets in the histogram under the predetermined threshold. As such buckets are combined, the corresponding values in columns 515, 520 and 525 of the histogram 500 will be incremented accordingly.

FIG. 4B is a flowchart illustrating a sample process flow 400B for consolidating the working histogram 500 in accordance with embodiments of the present invention. As described above, the present invention aims to construct a final histogram by consolidating buckets using the predicate weights determined at block 406.

Block 410 in Figure B requires the histogram generation system 200 to initialize a working histogram. Blocks 401 through 407 described above with reference to FIG. 4A illustrate an exemplar method in accordance with embodiments of the present invention for initializing a working histogram 500. However, it should be understood that the process flow 400B illustrated in FIG. 4B may use alternative methods for initiating the working histogram 500.

At block 412, the histogram generation compares the number of rows in the working histogram to a first predetermined threshold maximum number of rows. In many embodiments, the first predetermined threshold maximum number of rows will be determined by the database management system. For example, as discussed throughout, Microsoft SQL Server® places a cap on the number of buckets or steps in a histogram at 200. Accordingly, in embodiments of the present invention that are applied to databases in the Microsoft SQL Server® environment, the first predetermined threshold would be set equal to 200 steps. If the number of rows in the working histogram is less than the first predetermined threshold number, the working histogram does not need further consolidation.

If the number of rows in the working histogram 500 is greater than the first predetermined threshold, the histogram generation system 200 next determines if the histogram comprises less than a second predetermined threshold, wherein the second predetermined threshold is a value greater than the first predetermined threshold and less than or equal to twice the value of the first predetermined threshold. For instance, if a database management system imposes a first threshold of 200 buckets, the histogram generation system 200 may determine if the number of rows in the working histogram comprises less than 400 rows. The second predetermined threshold will have a theoretical maximum limit that is twice the value of the first predetermined threshold because the data set can be represented fully by sorting the distinct column values into either an EQ_ROWS column or a RANGE_ROWS column in the resulting histogram. However, there are often practical considerations that make it preferable to set the second predetermined threshold at a value less than twice the value of the first predetermined threshold.

If the working histogram 500 comprises less than the second predetermined threshold number of rows, the histogram generation system 200 performs a pairwise distribution function on one or more rows of the working histogram until the resultant number of rows is equal to the first predetermined threshold number of rows. At such point, the resulting histogram will still perfectly represent the full data set as each row in the data set can be represented by an EQ_ROWS value or a RANGE_ROWS value. As used herein, pairwise distribution means distributing the bucket values of the one or more buckets according to an equal distribution of the range values and equality values of each row in the histogram. However, if the histogram comprises greater than second predetermined threshold number of rows, the histogram is full, and the process flow proceeds to block 416.

As shown in block 416, where the working histogram contains a greater number of rows than the second predetermined threshold, the histogram generation system 200 performs entropy calculations between each sequential pair of rows in the working histogram 500. More specifically, for each row in the working histogram 500, the histogram generation system will calculate the entropy for such row in addition to measuring the entropy of such row combined with the next sequential row. The resulting change in entropy can then be used to estimate the information loss that will result from the combination of any two rows in the working histogram. As used herein, entropy means the similarity and dispersion of the data associated with each pair of the one or buckets. Exemplary embodiments of the present invention use Shannon's entropy formula, set forth as follows:

$$S = -\Sigma_i P_i \log P_i, \text{where } P_i \text{ is the probability of each possible outcome } i.$$

For example, in a simple table of three rows i, j, and k, each comprising an EQ_ROW value and a RANGE_ROW value and where the RANGE_HI_KEY of each row is ascending, and a value (v) that resides in a particular row, the entropy calculation would equal the sum of the probability all possible states of v within the given row. If (v) is in row j, prior to the combination of any rows, there are two possible states for the value (v): it is either an EQ_ROW in row j or a RANGE_ROW in row j. Thus, the entropy calculation for row j before combination would equal the sum of the probability that the value (v) is any possible state multiplied by a logarithmic function of that probability. A similar calculation can be performed on rows i and k for a value (v) that exists in those respective rows. In order to determine the information loss of the combined rows, the histogram generation system 200 can perform the same calculation using the probability of each state in the combined rows. The resulting information loss will be equal to the difference of the entropy of the combined rows and the entropy of the individual rows. Using the above example, the information loss from combining rows j and k can be determining by measuring the difference in entropy values of the combined rows against the sum of the entropy values of rows j and k individually.

In addition, when the histogram generation system 200 combines any pair of adjacent rows in the working histogram 500, the system logs a legacy information loss of such combination. Where a row in the working histogram 500 has not yet been combined with any other rows, it is assigned an initial legacy information according to the following:

Legacy Info. Loss=1−S, where S is the initial entropy value for the given row.

Each time a row is consolidated, the legacy information loss for the adjacent rows (i.e., the rows immediately preceding and following the row that is combined) is updated by summing the legacy information loss values of the two combined rows and dividing that number by the total entropy of the combined row.

As shown in block 418, the histogram generation system 200 additionally calculates one or more metrics associated with the data in the rows of the working histogram 500. The one or more metrics comprise at least a predicate weight factor, which can be multiplied by one or more additional metrics to produce a cost function. Such metrics may comprise one or more of a range penalty, size penalty, and a scale parameter. As described in more detail below, the cost function is determined based on the one or more metrics and is used to determine the lowest cost of combining two buckets in the working histogram 500 to construct a final histogram. As used herein, a range penalty is measurement of the numerical distance between two consecutive row values. In a simple example, where consecutive rows have RANGE_HI_KEY values of 100, 200, and 205, the range penalty of combining the rows having RANGE_HI_KEY values of 100 and 200 will be higher than the range penalty of combining the rows having RANGE_HI_KEY values of 200 and 205, because the former two rows are separated by a greater numerical distance. In embodiments of the invention, the range penalty may further take into the account the relative distance between two rows of the working histogram 500 in comparison to the total range of column values in the table. In exemplary embodiments of the invention, range penalties are calculated in accordance with the following formula:

$$\text{Range Penalty}_i = \frac{1}{1 + e^{-k(x_i - x_{i+1})}},$$

where $x_i$ is the RANGE_HI_KEY value of a row i, and $x_{i+1}$ is the RANGE_HI_KEY of the next sequential row. In the above formula, k is a scaling constant that is used to approximate the spread of the logistic function, and can be determined using the following formula:

$$k = \frac{2\sqrt{\frac{x_{i+1}}{x_i}} - 1}{(x_d - x_1)}$$

As discussed above, the predicate weights for a given row are assigned based on estimating the value of a kernel density function at the RANGE_HI_KEY value for the given row. In exemplary embodiments, the kernel density function is calculated as a gaussian kernel with a dynamically sized bandwidth that is proportional to the variance of the predicate literals in the captured predicate data. Then, for each value in the data table or sample data table (which form the initial row values of the working histogram 500), the value of the kernel density estimate is calculated by summing evaluated kernel function at the table value of each contributing predicate literal. In some embodiments, the kernel density function may need to be corrected to account for density at either pole of the defined bandwidth to account for specific boundary conditions. Further, the density values calculated in accordance with the foregoing process is scaled so that there is a minimum of one across the entire vector of weights for a given histogram. In this regard, the table values that are least influenced by the predicate weighting vector (i.e., those that are furthest away from the respective predicate literals) are not affected by the resulting cost function (i.e., they receive only a predicate weighting factor of one).

Lastly, the histogram generation system 200 may be configured to calculate a scale parameter metric that corresponds to the amount of memory required to describe the information that is combined into a RANGE_ROW from an EQ_ROW when a working histogram row is combined with the next sequential row. In embodiments of the invention, the scale parameter metric for a given row i is equal to the binary logarithm of the number of EQ_ROWS in the given row of the working histogram 500.

In embodiments of the present invention, the cost function is calculated at least in as a multiple of the predicate weight value calculated in accordance with the process described above. In exemplary embodiments, the cost function further accounts for the information loss, legacy information loss, range penalty, and scale parameter. The cost function can be described as C=(IL+LIL+RP)*PW*SP, where C is the cost function, IL is the information loss, LIL is the legacy information loss, PW is the predicate weight, and SP is the scale parameter. Once the value of the cost function has been determined for each row in the working histogram 500, the histogram generation system 200 can begin combining the rows with the lowest cost function with their neighboring rows, as further described with respect to the remaining blocks in FIG. 4B.

At block 420, the histogram generation system 200 merges the row in the working histogram 500 that has the lowest value for the calculated cost function described above with the next sequential row in the working histogram 500. When merging the rows of the working histogram 500, the row with the higher RANGE_HI_KEY will keep the same value for its RANGE_HI_KEY and will have the same number of EQ_ROWS following the merger. However, the RANGE_ROWS will be incremented by an additional amount equal to the RANGE_ROWS and EQ_ROWS of the preceding row in the working histogram 500. The DISTINCT_RANGE_ROWS will likewise be incremented accordingly and AVG_RANGE_ROWS will be recalculated.

At block 424, the histogram generation system 200 calculates the total number of rows remaining in the working histogram following the combination to determine whether the number of rows is less than the first predetermined number of rows measured at block 412. If the total number of rows is less than or equal to the first predetermined number of rows, no further consolidation of rows will be required in order to construct the histogram with an appropriate number of rows or step values.

If the total number of rows determined at block 424 exceeds the first predetermined number of rows, further consolidation will still be required. Accordingly, at block 426, the histogram generation system 200 will recalculate the entropy of the remaining rows and the other metrics described above by repeating the process beginning at block 416 and repeating until the total number of rows is less than or equal to the first predetermined threshold number. At such point, no further consolidation is required, and the histogram can be constructed based on the consolidated rows as described in the foregoing.

FIG. 6 depicts a fully constructed histogram 601 generated in accordance with the systems and methods described herein. As shown in FIG. 6, the histogram 601 comprises a plurality of buckets, each including a value of EQ_ROWS 611 and RANGE_ROWS 613. As shown in FIG. 6, the histograms generated in accordance with the present invention may comprise buckets that are more closely grouped together where there is a higher density of query predicates (i.e., the distance between the RANGE_HI_KEY is less between adjacent buckets where there is a high frequency of predicate literals in the captured query data). Such high density areas are depicted in the shaded area of the histogram 650. Where the RANGE_HI_KEY values are grouped more closely together, greater resolution can be obtained in the resulting histogram, as shown in the shaded region 650. Thus, query execution plans for predicates containing values in the 650 will more efficiently capture the data contained therein.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium comprise, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for generating a histogram, the method comprising the steps of:
  (a) initialize a working histogram for a data column, the data column comprising a plurality of data values, wherein the working histogram comprises a plurality of rows, each row corresponding to a unique data value from the plurality of data values;
  (b) capture one or more queries, wherein the one or more queries comprise one or more predicate literals;
  (c) generate a weight vector based on the predicate literals, wherein the weight vector comprises a plurality of weight values, each weight value corresponding to one of the plurality of rows of the working histogram;
  (d) calculate a cost value for each row of the working histogram, wherein each cost value is determined at least in part on an information loss and the weight value corresponding to one of the rows of the working histogram;
  (e) identify a first row in the working histogram having a lowest cost value of the plurality of rows in the working histogram; and
  (f) merge the first row of the working histogram with a second row of the working histogram,
  wherein the information loss is calculated as an entropy value of a merged row in the working histogram less the sum of the entropy of a first row in the working histogram and a second row in the working histogram, wherein the merged row comprises the first row and the second row.

2. The method of claim 1, further comprising the steps of:
  calculate a total number of rows in the working histogram;
  determine that the number of rows in the working histogram is greater than a predetermined threshold number of rows; and repeat steps (c) through (f) until the total number of rows in the working histogram is less than the predetermined threshold number of rows.

3. The method of claim 1 further comprising:
compare a distribution of weight values to a distribution of the rows in the working histogram; and
determine that distribution of weight values is sufficiently different to the distribution of the rows in the working histogram.

4. The method of claim 3, wherein comparing the distribution of weight values to the distribution of the rows in the working histogram further comprises:
performing statistical non-parametric test to generate a comparison score; and
determining that the comparison score is less than a predetermined threshold comparison score.

5. The method of claim 1, wherein capturing one or more queries comprises capturing one or more queries that meet or exceed a predetermined threshold.

6. The method of claim 5, wherein the predetermined threshold is a runtime for the one or more queries.

7. The method of claim 5, wherein the predetermined threshold is a CPU time of a query.

8. The method of claim 1, wherein generating a weight vector further comprises:
generating a kernel density function for the one or more predicate literals; and
evaluating the kernel density function at each row in the working histogram.

9. The method of claim 1, where entropy is calculated using Shannon's entropy formula.

10. The method of claim 1, wherein the method further comprises:
calculating one or more of a range penalty, an information loss, a legacy information loss, and a scaling parameter.

11. The method of claim 10, wherein the cost function is further based on the one or more of a size penalty, an information loss, a legacy information loss, and a scaling parameter.

12. The method of claim 1, wherein the first row of the working histogram and the second row of the working histogram are adjacent rows.

13. The method of claim 1, wherein the data column is indexed.

14. The method of claim 13, wherein the indexed data column is filtered.

15. A method for generating a histogram, the method comprising the steps of:
(a) initialize a working histogram for a data column, the data column comprising a plurality of data values, wherein the working histogram comprises a plurality of rows, each row corresponding to a unique data value from the plurality of data values;
(b) capture one or more queries, wherein the one or more queries comprise one or more predicate literals;
(c) generate a weight vector based on the predicate literals, wherein the weight vector comprises a plurality of weight values, each weight value corresponding to one of the plurality of rows of the working histogram;
(d) calculate a cost value for each row of the working histogram, wherein each cost value is determined at least in part on an information loss and the weight value corresponding to one of the rows of the working histogram;
(e) identify a first row in the working histogram having a lowest cost value of the plurality of rows in the working histogram; and
(f) merge the first row of the working histogram with a second row of the working histogram,
wherein generating the weight vector further comprises:
generating a kernel density function for the one or more predicate literals; and
evaluating the kernel density function at each row in the working histogram, and
wherein the bandwidth for the kernel density function is proportional to the variance in the one or more predicate literals.

16. A computer-program product for generating a histogram, wherein the computer program product is embodied on at least one non-transitory computer-readable medium having computer-readable program code portions embodied therein, the computer-readable program code portions comprising executable portions configured to:
(a) initialize a working histogram for a data column, the data column comprising a plurality of data values, wherein the working histogram comprises a plurality of rows, each row corresponding to a unique data value from the plurality of data values;
(b) capture one or more queries, wherein the one or more queries comprise one or more predicate literals;
(c) generate a weight vector based on the predicate literals, wherein the weight vector comprises a plurality of weight values, each weight value corresponding to one of the plurality of rows of the working histogram;
(d) calculate a cost value for each row of the working histogram, wherein each cost value is determined at least in part on an information loss and the weight value corresponding to one of the rows of the working histogram;
(e) identify a first row in the working histogram having a lowest cost value of the plurality of rows in the working histogram; and
(f) merge the first row of the working histogram with a second row of the working histogram,
wherein the information loss is calculated as an entropy value of a merged row in the working histogram less the sum of the entropy of a first row in the working histogram and a second row in the working histogram, wherein the merged row comprises the first row and the second row.

17. The computer program product of claim 16, further comprising executable portions configured to:
calculate a total number of rows in the working histogram;
determine that the number of rows in the working histogram is greater than a predetermined threshold number of rows; and
repeat steps (c) through (f) until the total number of rows in the working histogram is less than the predetermined threshold number of rows.

18. A system for generating histograms, the system comprising:
a memory device with computer-readable program code stored thereon;
a communication device;
a processing device operatively coupled to the memory device and the communication device, wherein the processing device is configured to execute the computer-readable program code to:
(a) initialize a working histogram for a data column, the data column comprising a plurality of data values, wherein the working histogram comprises a plurality of rows, each row corresponding to a unique data value from the plurality of data values;

(b) capture one or more queries, wherein the one or more queries comprise one or more predicate literals;

(c) generate a weight vector based on the predicate literals, wherein the weight vector comprises a plurality of weight values, each weight value corresponding to one of the plurality of rows of the working histogram;

(d) calculate a cost value for each row of the working histogram, wherein each cost value is determined at least in part on an information loss and the weight value corresponding to one of the rows of the working histogram;

(e) identify a first row in the working histogram having a lowest cost value of the plurality of rows in the working histogram; and merge the first row of the working histogram with a second row of the working histogram, wherein the information loss is calculated as an entropy value of a merged row in the working histogram less the sum of the entropy of a first row in the working histogram and a second row in the working histogram, wherein the merged row comprises the first row and the second row.

19. The system of claim 18 where in the processing device is further configured to execute the computer-readable program code to calculate a total number of rows in the working histogram;

determine that the number of rows in the working histogram is greater than a predetermined threshold number of rows; and repeat steps (c) through (f) until the total number of rows in the working histogram is less than the predetermined threshold number of rows.

* * * * *